US009935895B2

(12) United States Patent
Korber

(10) Patent No.: US 9,935,895 B2
(45) Date of Patent: Apr. 3, 2018

(54) GATEWAY ADAPTED FOR VOD

(71) Applicant: SAGEMCOM BROADBAND SAS, Rueil-Malmaison (FR)

(72) Inventor: Nicolas Korber, Rueil-Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 11 days.

(21) Appl. No.: 14/363,218

(22) PCT Filed: Dec. 5, 2012

(86) PCT No.: PCT/EP2012/074451
§ 371 (c)(1),
(2) Date: Jun. 5, 2014

(87) PCT Pub. No.: WO2013/083607
PCT Pub. Date: Jun. 13, 2013

(65) Prior Publication Data
US 2015/0103693 A1  Apr. 16, 2015

(30) Foreign Application Priority Data

Dec. 5, 2011  (FR) ...................... 11 61135

(51) Int. Cl.
*H04L 12/24* (2006.01)
*H04L 12/66* (2006.01)
(Continued)

(52) U.S. Cl.
CPC .......... *H04L 49/15* (2013.01); *H04L 41/0803* (2013.01); *H04L 61/2015* (2013.01);
(Continued)

(58) Field of Classification Search
CPC ..... H04L 41/0226; H04L 49/15; H04L 69/08; G06F 12/0292
See application file for complete search history.

(56) References Cited

U.S. PATENT DOCUMENTS 6,748,439 B1 * 6/2004 Monachello ........ H04L 12/5692
340/1.1
6,807,184 B2 * 10/2004 Gutknecht .......... H04L 12/2898
370/401
(Continued)

FOREIGN PATENT DOCUMENTS

EP   1 482 712 A1   12/2004
EP   1 575 245 A1    9/2005
(Continued)

OTHER PUBLICATIONS

ABOBA; "The Mini-DHCP Server;" Microsoft; XP15009804; Sep. 29, 2001.
(Continued)

*Primary Examiner* — Alpus H Hsu
(74) *Attorney, Agent, or Firm* — Oliff PLC; R. Brian Drozd

(57) ABSTRACT

Some embodiments of the present application relate to the field of gateways for internet access, associated video service decoders and the methods for broadcasting video content by an operator through such a gateway intended for such a decoder. A virtual MAC address is dedicated to VOD on the decoder. This address is then recognized by the gateway. The gateway implements a direct circuit directly directing the traffic related to this virtual address between the interface for accessing the communications network and the gateway physical port to which the decoder is connected. Advantageously, the circuit is dynamically configured by intercepting the DHCP request used to configure this virtual address.

3 Claims, 3 Drawing Sheets

(51) Int. Cl.
 *H04L 12/933* (2013.01)
 *H04L 29/12* (2006.01)

(52) U.S. Cl.
 CPC .......... *H04L 61/35* (2013.01); *H04L 61/6022* (2013.01); *H04L 61/2514* (2013.01); *H04L 61/6013* (2013.01)

(56) References Cited

U.S. PATENT DOCUMENTS

| | | | | |
|---|---|---|---|---|
| 7,512,138 | B2* | 3/2009 | Horoschak | H04L 29/12 370/395.54 |
| 7,630,341 | B2* | 12/2009 | Buddhikot | H04L 29/12358 370/331 |
| 7,639,686 | B2* | 12/2009 | Wetterwald | H04L 29/12358 370/392 |
| 7,965,693 | B2* | 6/2011 | Jiang | H04L 63/08 370/338 |
| 8,125,915 | B2* | 2/2012 | Brenes | H04L 12/24 370/241 |
| 8,387,112 | B1* | 2/2013 | Ranjan | G06F 21/57 717/168 |
| 8,619,765 | B2* | 12/2013 | Harrington | H04L 29/12367 370/389 |
| 8,897,303 | B2* | 11/2014 | Xiong | H04L 29/12028 370/389 |
| 8,937,950 | B2* | 1/2015 | Dunbar | H04L 12/462 370/392 |
| 9,014,054 | B2* | 4/2015 | Dunbar | H04L 12/462 370/255 |
| 9,118,687 | B2* | 8/2015 | Murphy | H04L 61/103 |
| 9,160,609 | B2* | 10/2015 | Dunbar | H04L 12/4625 |
| 2006/0280189 | A1* | 12/2006 | McRae | H04L 12/462 370/401 |
| 2007/0022469 | A1* | 1/2007 | Cooper | H04K 1/00 726/3 |
| 2009/0083406 | A1 | 3/2009 | Harrington et al. | |
| 2011/0208843 | A1* | 8/2011 | Johansson | H04L 41/0846 709/220 |
| 2013/0058256 | A1* | 3/2013 | Li | H04L 61/2514 370/255 |

FOREIGN PATENT DOCUMENTS

| | | |
|---|---|---|
| EP | 1 662 753 A1 | 5/2006 |
| EP | 2 048 858 A1 | 4/2009 |
| WO | WO 95/04322 A1 | 2/1995 |
| WO | WO 2010/053413 A1 | 5/2010 |

OTHER PUBLICATIONS

DROMS; "Dynamic Host Configuration Protocol;" Bucknell University; XP015007915; Mar. 1, 1997.

Mar. 7, 2013 International Search Report issued in International Patent Application No. PCT/EP2012/074451.

Translation of Mar. 7, 2014 International Preliminary Report on Patentability issued in International Patent Application No. PCT/EP2012/074451.

\* cited by examiner

GATEWAY ADAPTED FOR VOD

FIELD OF THE INVENTION

The present invention concerns the field of internet access gateways, associated video service decoders and the methods for broadcasting video content by an operator through such a gateway to such a decoder.

BACKGROUND

In this document operator means the entity providing a service of access to a communications network, typically the internet, coupled to a service of access to a multimedia content, in particular video.

This type of operator offers its service and to do this generally provides two items of equipment. A first item of equipment consists of an access gateway to the communications network. It is known to the general public by the English term "box". Technically it is generally a modem, for example of the ADSL (Asymmetric Digital Subscriber Line) type but may be based on other technologies, such as cable networks, optical fibre or other. This modem is coupled to a router that enables connecting several items of equipment thereto. The gateway therefore forms the link between a data communications network on the one hand and a local area network to which the user connects various items of equipment. These items of equipment may be personal computers, smartphones, game consoles, television sets, etc. These gateways enable the user to access an increasing number of services using the communications network. Among the most popular are access to IP (Internet Protocol) telephony and access to television channels broadcast.

Access to television channel broadcast services generally involves a second item of equipment called a decoder (set top box). This item of equipment is used to receive the digital streams that transport the television channels and to reconstitute, from these streams, the audio and video signals for display on a television set.

In addition to this basic television service, the offer of a video on demand (VOD) service is becoming widespread. This offer consists of a content catalogue available on the servers of the operator. This catalogue is accessible to the user on his television set via his decoder. The choice of a particular content causes a request to the servers, which then broadcast the content to the decoder for display on the television set. These operations may be performed using conventional IP network technologies.

However, since this service is charged, the operator generally wishes to have available a high level of control of the contents broadcasting and of the destination thereof. In particular, he wishes to avoid the broadcast content being able to be easily diverted onto a personal computer.

SUMMARY

The invention aims to solve the above problems through the use of a virtual MAC address dedicated to VOD on the decoder. This address is then recognised by the gateway. The gateway implements a direct circuit directly directing the traffic related to this virtual address between the interface for accessing to the communications network and the interface of the gateway to which the decoder is connected. Advantageously, the circuit is dynamically configured by interception of the DHCP request used to configure this virtual address.

The invention thus concerns a device for processing information intended to be used as a gateway between a local area communications network and a wide area communications network which comprises a plurality of interfaces for connecting equipment of the local area network, an interface connected to the wide area communications network, a router for routing the data streams between these various interfaces, and a direct circuit management module for managing a layer-2 direct circuit between the interface connected to the wide area communications network and one of the interfaces for connecting equipment of the local area network.

According to the invention, said information processing device is intended to receive the connection, on one of said interfaces, of equipment having a plurality of layer-2 virtual addresses, at least one of which is dedicated to a particular service. It is furthermore characterised in that it comprises means for detecting a marker relating to a particular service with which a particular DHCP discovery request that said device receives from a connected item of equipment is provided, means for relaying said particular discovery request to a remote DHCP server of the wide area communications network, and means for configuring the direct circuit management module thanks to the layer-2 virtual address from which said particular DHCP recovery request is originated, such that said direct circuit management module directly relays the traffic going to or coming from said layer-2 virtual address of said connected equipment.

The present invention also concerns an item of equipment intended to be connected to an information processing device as has just been described and which further comprises a plurality of layer-2 virtual addresses and means for marking a particular DHCP discovery request relating to the configuration of one of these virtual addresses relating to a particular service offered by said equipment.

The present invention also concerns a method for configuring at least two layer-2 virtual addresses of an item of equipment as has just been described connected to an interface of an information processing device as has just been described, said device being connected by an interface to a wide area communications network.

According to the invention, said method comprises the following steps:
- a step of sending a particular DHCP discovery request relating to the configuration of a first virtual address of said equipment, and/or
- a step of sending a conventional DHCP discovery request relating to the configuration of a second virtual address of said equipment; and
- when said device has recognised a particular request in a received DHCP discovery request:
  - a step of relaying the first request to a remote DHCP server, and
  - a step of configuring a layer-2 direct circuit thanks to the first layer 2 virtual address in said device between the interface connected to the wide area communications network and the interface to which said equipment is connected;
  - a step of receiving by said device a DHCP offer response sent by the remote DHCP server, and relaying, via the previously configured direct circuit, this response to said equipment;
  - a step of sending a configuration request by said equipment to the remote DHCP server via said direct circuit, and a step of receiving a response sent by the remote DHCP server carrying a layer-3 configuration related to the first virtual address of said equipment; and when said device has not recognised a particular request in a received DHCP discovery request:

a step of receiving a DHCP offer response sent by the DHCP server of said device;

a step of sending a configuration request by said equipment to the DHCP server of said device;

a step of receiving a response sent by the DHCP server of said device carrying a layer-3 configuration related to the second virtual address of said equipment.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF VARIOUS EMBODIMENTS

The invention has been developed in the context of the offer of a video on demand service, but it may apply identically to any service. The adopted technical solution is not specific to the service.

Figure 1:
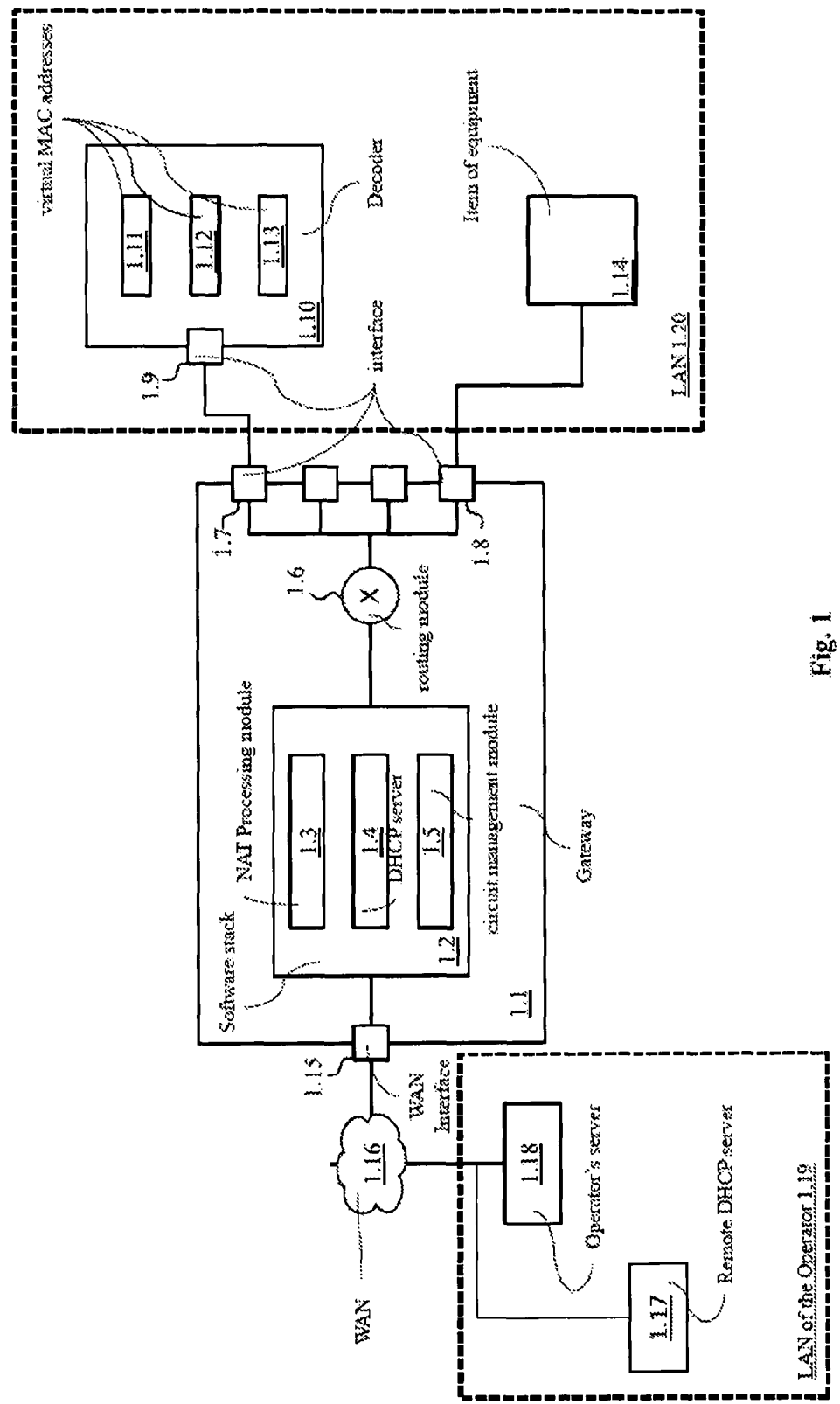
FIG. 1 illustrates the architecture of an example embodiment of the invention.

FIG. 1 illustrates the architecture of an example embodiment of the invention. This figure shows us a gateway 1.1 for accessing a wide area communications network 1.16. This network is generally referred to as a WAN (Wide Area Network), in contradistinction to a local area network 1.20, referred to as LAN (Local Area Network). The gateway 1.1, as its name indicates, is used as an interface between the two networks.

This gateway 1.1 therefore has an interface 1.15 connected to the WAN, hereafter WAN interface 1.15. This connection is typically a point-to-point connection using a technology from amongst ADSL, cable and optical fibre technologies, for the most usual. Any network technology can be used here.

The gateway 1.1 typically has a set of interfaces for accessing the LAN 1.20. The figure references an interface 1.7 to which the decoder 1.10 is physically connected. It also illustratively references an interface 1.8 to which another item of equipment 1.14, which may for example be a personal computer, is physically connected.

The network traffic is routed over its interfaces by a routing module 1.6. The function of such a router is widely known to persons skilled in the art and we shall not detail here its known functionalities based on a conventional layer-3, IP layer, routing based on routing tables. Such a router typically implements a layer-3 address translation functionality known by the term NAT (Network Address Translation). This mechanism allows making public on the WAN only the address of the WAN interface 1.15 of the gateway 1.1. Any request originating in an item of equipment of the LAN 1.20 reaches the gateway 1.1 and is processed by the NAT in order to replace the original IP address with that of the gateway 1.1 before being relayed to the WAN. The response therefore reaches the gateway 1.1, which recognises the message and replaces the destination address with the address of the LAN equipment originating the request before relaying this response over the LAN 1.20. The NAT processing module is referenced 1.3 in the software stack 1.2 that manages the gateway 1.1.

This software stack 1.2 managing the gateway 1.1 also typically hosts a DHCP (Dynamic Host Control Protocol) server 1.4 that allows dynamically configuring any equipment connected to the LAN 1.20 without intervention by the user. The precise operating of the DHCP protocol can be found in the RFCs (Requests For Comment) numbers 1531, 1534, 2131 and 2132. We shall here simply accept that the protocol operates as follows: an item of equipment (for example the decoder 1.10 in FIG. 1) that is connected to the LAN 1.20 sends a layer-2 broadcast message with its layer-2 address, i.e. its MAC address. This message is called a "DHCP discover"; it aims to discover the existence of a DHCP server on the network. The or each DHCP server in the network then responds to the equipment by offering it an available layer-3 address, i.e. an IP address. The equipment then broadcasts a configuration request to the DHCP server of its choice, which responds thereto with the requested connection parameters. These parameters typically comprise the definitive IP layer address of the equipment, a sub-network mask and the IP address of the gateway 1.1 in order to join the WAN 1.16.

The decoder 1.10 has an interface 1.9 directly connected to the gateway 1.1, to the interface 1.7 of this gateway 1.1. Typically the decoder 1.10 has an MAC address and obtains its layer-3 configuration via the DHCP mechanism previously described. Alternatively, this configuration may be statically recorded in the decoder 1.10. When this decoder 1.10 communicates with the WAN 1.16 using these conventional mechanisms, the traffic is seen from the WAN 1.16 as emanating from the gateway 1.1 because of the NAT address translation mechanism performed by the gateway 1.1. This feature does not create any particular problem for a certain number of services used by the decoder, such as access to the internet or other.

On the other hand, for a service such as the VOD service, the operator requires more control and to "see" the decoder 1.10 directly at the network level, at least to ensure that the streams associated with the VOD are indeed consumed by the decoder and not diverted in the LAN 1.20.

In order to obtain this control of certain services, the operator will, with regard to the services that he wishes to control, manage the decoder as forming part of a network of the LAN type particular to the operator, referred to hereinafter as the LAN of the operator 1.19, under the direct control of the operator rather than like equipment of the LAN 1.20 of the user. More exactly, the decoder 1.10 will be seen as equipment of the LAN of the operator 1.19 only with regard to the service that the operator wishes to control, for example here the VOD service. With regard to the other services offered by the decoder 1.10, the decoder 1.10 will operate as a conventional item of equipment of the LAN 1.20 of the user.

The adopted solution is based on the use of virtual layer-2 addresses, i.e. MAC addresses, in the decoder 1.10. A first virtual MAC address 1.11 is dedicated to the service that it is wished to control in a particular manner, here the VOD service. This MAC virtual address will be configured at the layer-3, the IP layer, as an address of the LAN of the operator 1.19. For the other services, one or more other virtual MAC addresses, the addresses 1.12 and 1.13 in the figure, are managed in a traditional manner and configured at the IP layer as interfaces of the LAN 1.20 of the user.

The use of layer-2 virtual addresses is equivalent to using different logic interfaces, all using the same physical interface. Each logic interface has its own layer-2 address in order to separate the traffic at this layer between the gateway 1.1 and the decoder 1.10. Each interface has its own configuration in layer-3, the IP layer, to communicate with the other entities in the network.

A separation of the network traffics dedicated to the VOD service and the other network traffics in the decoder is thus obtained. The VOD traffic is therefore never routed in the LAN 1.20 of the user, making any diversion of the stream difficult for the user.

The correct routing of the two types of stream between the WAN and the decoder 1.10, the first type being the stream dedicated to the VOD service and the second being the conventional stream, requires adaptation at the gateway 1.1. This adaptation is done in the form of a circuit management module 1.5 that establishes a direct layer-2 circuit (bridge) between the interface 1.7 connected to the decoder on the LAN 1.20 side and the WAN interface 1.15.

This circuit management module 1.5 analyses the layer-2 traffic that reaches the gateway 1.1. It detects all the messages reaching the interface 1.7 and having the virtual MAC address 1.11 dedicated to the protected service as source MAC address. These packets are then directly sent to the WAN interface 1.15 without being processed by the conventional routing module 1.6 or NAT processing module 1.3.

Likewise, the layer-2 traffic reaching the WAN interface 1.15 and having as destination address the virtual MAC address 1.11 dedicated to the protected service is directly sent to the interface 1.7 without being processed by the conventional routing module 1.6 or NAT processing module 1.3.

The operator allocates an IP address to the virtual interface of the decoder 1.10 dedicated to the protected service in the LAN 1.20 that is particular thereto and is therefore dedicated to this service. The means used by the operator for routing the IP packets intended for the decoder 1.10 on the gateway 1.1 is out of the scope of the description of this document. It is possible for example to use an IP-in-IP encapsulation. Thus the data relating to the protected service of the decoder 1.10 are transported at the layer-2 to the virtual MAC address of the decoder 1.10, since the latter forms part of the LAN of the operator 1.19 dedicated to the service. The packet will therefore be detected by the circuit management module 1.5 allocated to the direct circuit and routed in the gateway 1.1 directly to the interface 1.7 connected to the decoder 1.10.

The configuration of the circuit management module 1.5 for managing the direct circuit can be statically or dynamically done. According to an advantageous embodiment of the invention, the circuit management module 1.5 is dynamically configured. For this purpose, the decoder 1.10 is provided with means for sending a particular DHCP discovery request relating to the configuration of one of its virtual addresses. This request is a discovery request (DHCP discover) of the DHCP server that contains a particular identifier for distinguishing it from a traditional DHCP discovery request. This identifier may be a particular parameter in the header of the DHCP packet.

The gateway 1.1, and more particularly its DHCP server 1.4, then has means for detecting this particular DHCP discovery request marked for this purpose. Instead of serving this request by means of a DHCP offer response, the gateway 1.1 relays it without processing it to any remote DHCP server 1.17 in the WAN 1.16 of the operator. It takes this opportunity to note the original MAC address of the request (the virtual address of the decoder 1.10 concerning the protected service) and to configure the circuit management module 1.5 with this MAC address.

Once this is done, the DHCP offer response sent by the remote DHCP server 1.17 of the operator is automatically relayed, by means of the direct circuit that has just been established by the circuit management module 1.5, to the decoder 1.10, which can then receive its level-3, i.e. IP, configuration.

This way of dynamically programming the circuit between the interface 1.7 connected to the decoder on the LAN 1.20 side and the WAN interface 1.15 by means of the circuit management module 1.5 allows being automatically adapted, in the event of change of decoder or if the decoder is not supplied by the operator.

The DHCP discovery requests sent for the configuration of the other virtual addresses of the decoder do not have a marker identifying them as relating to the protected service. They are therefore conventionally processed by the DHCP server 1.4 of the gateway 1.1 and configured within the local network LAN 1.20 of the user.

The traffic relating to the protected service per se, originating in or intended for the virtual interface of the decoder 1.10, is also relayed to the relevant servers 1.18 of the operator. Typically it is an RTSP (Real Time Streaming Protocol) request in the case of VOD.

Figure 2:
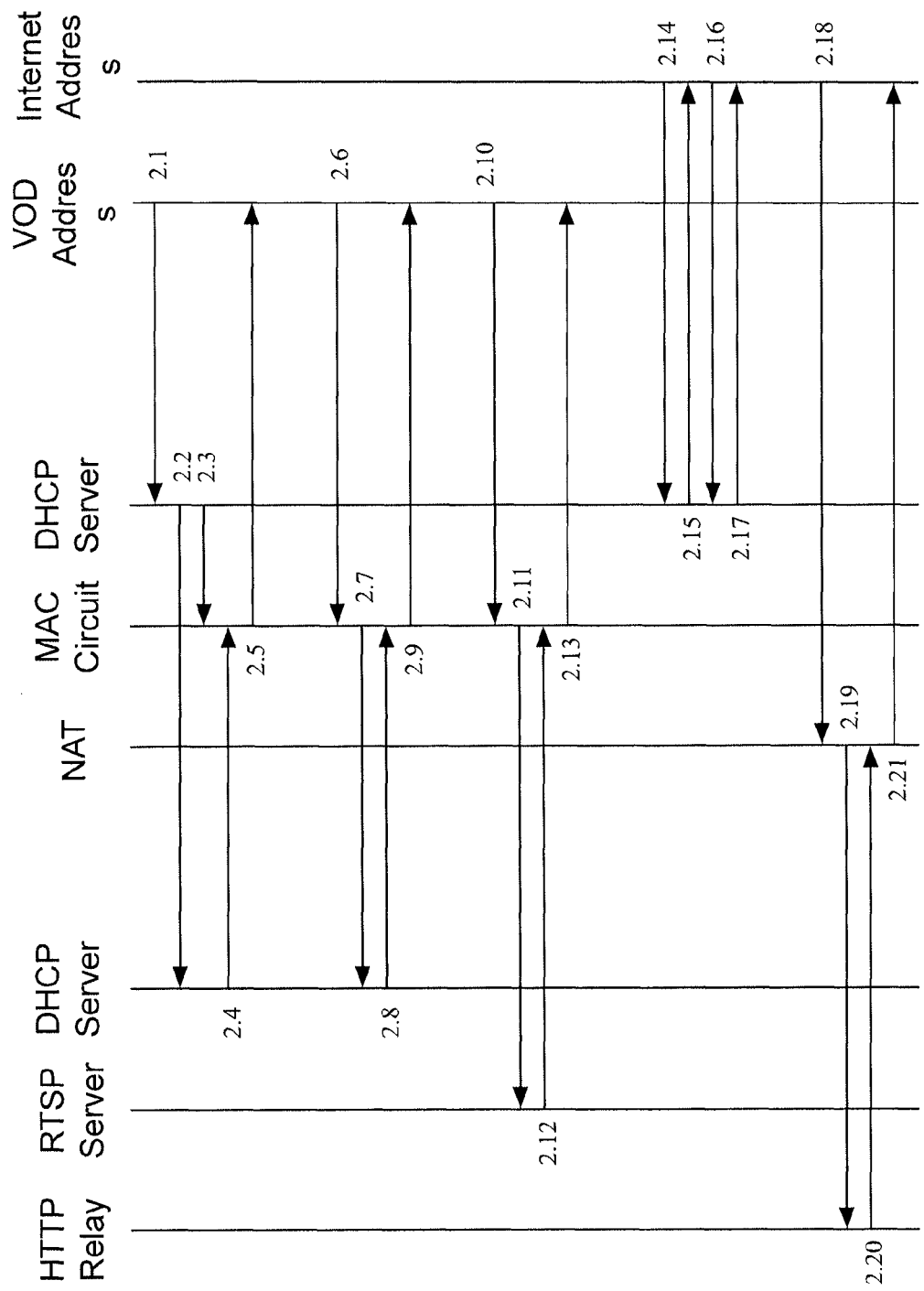
FIG. 2 illustrates the exchanges of typical messages of an example embodiment of the invention.

FIG. 2 illustrates the message exchanges involved in the various operating phases of the invention according to the embodiment where the configuration of the circuit is automatic.

A first set of messages illustrates the DHCP configuration of the virtual MAC address 1.11 of the decoder 1.10 at the operator. The DHCP discovery request 2.1 is sent from this virtual MAC address 1.11 and is received by the DHCP server 1.4 of the gateway 1.1. It is relayed, 2.2, to the remote DHCP server 1.17 of the operator. The DHCP server 1.4 of the gateway 1.1 uses this to configure, 2.3, the circuit management module 1.5 of the gateway 1.1 by creating the direct circuit on the virtual MAC address 1.11 contained in the request 2.1. The response, in the form of a DHCP offer 2.4, is sent and relayed directly, 2.5, by the circuit management module 1.5, to the decoder 1.10.

The following messages correspond to a request 2.6 for configuring the virtual MAC address 1.11. This request is relayed 2.7 by the circuit management module 1.5 to the LAN of the operator 1.19, where it is processed by the DHCP server. The response 2.8 passes through the circuit management module 1.5 in order to be relayed 2.9 to the decoder 1.10. The configuration carried by the response 2.9 enables the configuration at layer-3 of the virtual MAC address 1.11 of the decoder 1.10 in a remote network, typically an LAN of the operator 1.19 dedicated to the protected service.

The following messages illustrate a request relating to the service protected by the invention. An RTSP request 2.10 is sent from the virtual MAC address 1.11 dedicated to the protected service of the decoder 1.10. This request 2.10 is captured by the circuit management module 1.5 and is relayed 2.11 to the LAN of the operator 1.19. It there continues its route to the VOD server, which responds to the request by sending a response 2.12. The response is sent in the form of an IP traffic from the LAN of the operator 1.19, to the decoder 1.10. Then, once arrived at the gateway 1.1, this traffic is directed 2.13 by the circuit management module 1.5 to the decoder 1.10, since it is intended, at the layer-2, for the virtual MAC address 1.11 of the decoder 1.10.

The following messages illustrate the operation of the other virtual interfaces of the decoder 1.10, those that use the virtual addresses 1.12 and 1.13, for example. Each interface must obtain its network configuration. To do this, it sends a first discovery request DHCP 2.14. This request is received by the DHCP server of the gateway 1.1. As this request does not include a marker relating to the protected service, it is conventionally served by the DHCP server 1.4 of the gateway 1.1, which therefore responds with a DHCP offer 2.15. The result is the configuration request 2.16 and its response 2.17. As from this time, the interface is configured as forming part of the LAN 1.20 of the user and can use the gateway 1.1 for accessing any service on the WAN 1.16 communications network in a conventional manner.

Typically, an HTTP (Hyper Text Transfer Protocol) request 2.18 is routed through the NAT processing module 1.3 and is relayed 2.19 to the destination server, typically via an HTTP relay (proxy) of the operator. When the relay receives the response, it relays it 2.20 to the gateway 1.1. The address translation mechanism operated by the NAT processing module 1.3 enables the response 2.21 to be routed, in the gateway 1.1, to the decoder 1.10.

It is found that the traffic relating to the protected service is separated from the other traffic. The first one is routed in a specific layer-3 LAN of the operator 1.19 and controlled by it. The other traffic is routed normally and separately in the LAN 1.20 of the user.

An alternative to the embodiment described above consists of using virtual local networks, called VLANs (Virtual Local Area Networks). This well known mechanism also enables separating the data streams from the same physical interface thanks to layer-2 virtual addresses. Indeed, virtual local networks are layer-2 enciphered tunnel techniques. Each virtual address could use a particular VLAN. At the gateway, the differentiation of the streams could then be done by VLAN rather than by MAC address.

We would then have a first data stream dedicated to the protected service and marked by a VLAN, for example using the label 1001. A second stream dedicated to control and marked by a VLAN using for example the label 1002, while the other data streams would be marked by a VLAN using the label 1003. Each of these VLANs using its own virtual MAC address in the decoder.

This alternative does however have a few constraints. The decoder must be in a position to mark the streams. The gateway must support the VLANs. The operator must also be in a position to manage the VLANs for the protected service. In the contrary case, the gateway must be in a position to delete the marking of the VLANs before relaying the traffic relating to the protected service to the operator. It is also necessary for the operator or the gateway to delete the marking of the data streams that are to be relayed to the internet. This is because the VLANs cannot exist in the internet world or on machines connected to the LAN. The DHCP server of the gateway must always distinguish the packets coming from the decoder in order to relay them to the DHCP server of the operator. This discrimination may be identical to that done in the first embodiment or implement the use of the VLANs.

Figure 3:
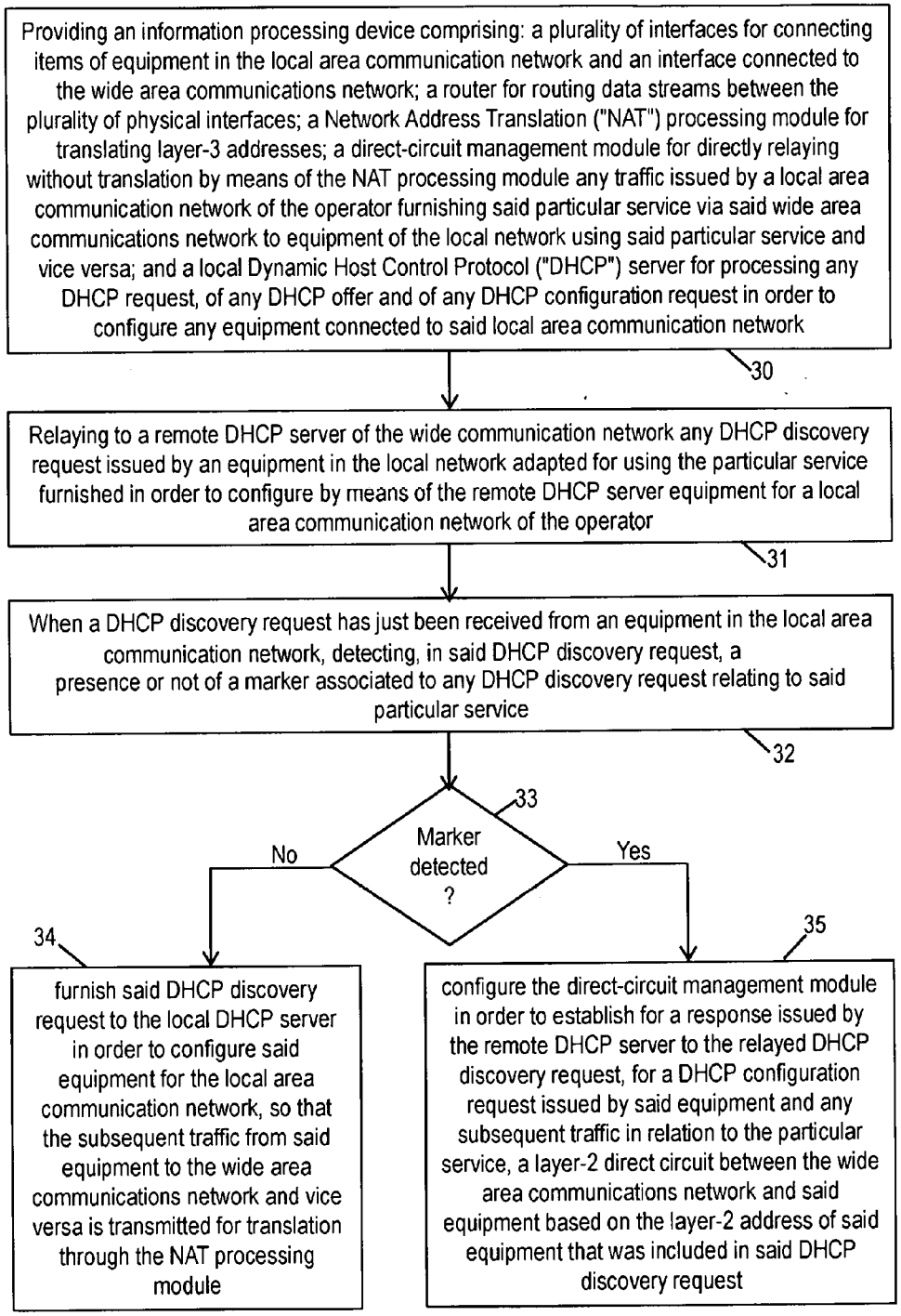
FIG. 3 illustrates a method for configuring an information processing device used as a gateway between a local area communications network of a user and a wide area communications network according to one embodiment of the invention.

FIG. 3 illustrates a method for configuring an information processing device used as a gateway between a local area communications network of a user and a wide area communications network according to one embodiment of the invention.

In step 30, the method includes providing an information processing device comprising: a plurality of interfaces for connecting items of equipment in the local area communication network and an interface connected to the wide area communications network; a router for routing data streams between the plurality of physical interfaces; a Network Address Translation ("NAT") processing module for translating layer-3 addresses; a circuit management module for directly relaying without translation by means of the NAT processing module any traffic issued by a local area communication network of the operator furnishing said particular service via said wide area communications network to equipment of the local network using said particular service and vice versa; and a local Dynamic Host Control Protocol ("DHCP") server for processing any DHCP request, of any DHCP offer and of any DHCP configuration request in order to configure any equipment connected to said local area communication network.

In step 31, the method includes relaying to a remote DHCP server of the wide communication network any DHCP discovery request issued by equipment in the local network adapted for using the particular service furnished in order to configure by means of the remote DHCP server equipment for a local area communication network of the operator.

In step 32, the method includes, when a DHCP discovery request has just been received from an equipment in the local area communication network, detecting, in said DHCP discovery request, a presence or not of a marker associated to any DHCP discovery request relating to said particular service.

In step 33, the method includes determining whether a marker is detected or not.

If the decision in step 33 is no, the method may proceed to step 34 where the method furnishes said DHCP discovery request to the local DHCP server in order to configure said equipment for the local area communication network, so that the subsequent traffic from said equipment to the wide area communications network and vice versa is transmitted for translation through the NAT processing module If the decision in step 33 is yes, the method may proceed to step 35 where the method configures the circuit management module in order to establish for a response issued by the remote DHCP server to the relayed DHCP discovery request, for a DHCP configuration request issued by said equipment and any subsequent traffic in relation to the particular service, a layer-2 direct circuit between the wide area communications network and said equipment based on the layer-2 address of said equipment that was included in said DHCP discovery request.

The invention claimed is:

1. An information processing device used as a gateway between a local area communications network of a user and a wide area communications network, the information processing device comprising:

a plurality of interfaces for connecting equipment in the local area communications network of the user and an interface connected to the wide area communications network;

a router for routing data streams between the plurality of interfaces and the interface connected to the wide area communications network;

a Network Address Translation (NAT) processing module for translating layer-3 addresses, a circuit management module for directly relaying without translation by means of the NAT processing module any traffic issued by a local area communications network of an operator furnishing a particular service to the equipment of the local area communications network of the user using said particular service and vice versa, a local Dynamic Host Control Protocol (DHCP) server for processing of any DHCP request, of any DHCP offer and of any DHCP configuration request from the equipment in the local area communications network of the user, wherein any DHCP discovery request that is issued by one item of equipment in the local area communications network of the user adapted for using the particular service furnished by the operator via said wide area communications network, is relayed to a remote DHCP server of the wide area communications network in order to configure by said remote DHCP server said one item of equipment for the local area communications network of the operator, wherein, when a DHCP discovery request has just been received from said item of equipment in the local area communication network of the user:

wherein, in said DHCP discovery request, a presence or not of a marker associated to any DHCP discovery request relating to said particular service is detected, wherein, when said marker is detected, the circuit management module is configured, in order to establish for a response issued by the remote DHCP server to the relayed DHCP discovery request, for a DHCP configuration request issued by said item of equipment and any subsequent traffic in relation to the particular service, to manage a layer-2 direct circuit between the wide area communications network and said item of equipment based on a layer-2 address of said item of equipment that was included in said DHCP discovery request, and wherein, when no marker has been detected in the received DHCP discovery request, said DHCP discovery request is furnished to the local DHCP server in order to configure said item of equipment for the local area communications network of the user, so that the subsequent traffic from said item of equipment to the wide area communications network and vice versa is transmitted for translation through the NAT processing module.

2. An information processing system comprising:
the information processing device of claim 1, the information processing device being used as the gateway between the local area communications network of the user and the wide area communications network, at least one item of equipment in the local area communications network of the user adapted to use the particular service furnished by the operator via the wide area communications network, wherein:

said at least one item of equipment in the local area communications network of the user comprises at least two layer-2 virtual addresses, one of which being dedicated to said particular service, and is adapted to mark with a marker relating to said particular service, any DHCP discovery request issued by said one item of equipment and containing said layer-2 virtual address dedicated to said particular service.

3. A method for configuring an information processing device used as a gateway between a local area communications network of a user and a wide area communications network, said method comprising:

providing information processing device comprising: a plurality of interfaces for connecting equipment in the local area communications network of the user and an interface connected to the wide area communications network; a router for routing data streams between the plurality of interfaces and the interface connected to the wide area communications network; a Network Address Translation (NAT) processing module for translating layer-3 addresses; a circuit management module for directly relaying without translation by means of the NAT processing module any traffic issued from a local area communications network of an operator furnishing a particular service via said wide area communications network to the equipment of the local area communications network of the user using said particular service and vice versa; and a local Dynamic Host Control Protocol (DHCP) server for processing any DHCP request, of any DHCP offer and of any DHCP configuration request in order to configure any equipment connected to said local area communications network of the user;

relaying to a remote DHCP server of the wide area communications network any DHCP discovery request issued by one item of equipment in the local area communications network of the user adapted for using said particular service furnished in order to configure by means of said remote DHCP server said one item of equipment for the local area communications network of the operator, wherein, when a DHCP discovery request has just been received from the said one item of equipment in the local area communications network of the user;

detecting, in said DHCP discovery request, of a presence or not of a marker associated to any DHCP discovery request relating to said particular service;

when said marker is detected, configuring the circuit management module in order to establish for a response issued by the remote DHCP server to the relayed DHCP discovery request, for a DHCP configuration request issued by said one item of equipment and any subsequent traffic in relation to the particular service, to manage a layer-2 direct circuit between the wide area communications network and said one item of equipment based on the layer-2 address of said one item of equipment that was included in said DHCP discovery request, and when no marker has been detected in the received DHCP discovery request, furnishing said DHCP discovery request to the local DHCP server in order to configure said one item of equipment for the local area communications network of the user, so that the subsequent traffic from said one item of equipment to the wide area communications network and vice versa is transmitted for translation through the NAT processing module.

* * * * *